(12) United States Patent
Pilskalns

(10) Patent No.: US 10,633,115 B2
(45) Date of Patent: Apr. 28, 2020

(54) AUTONOMOUS SYSTEM FOR UNMANNED AERIAL VEHICLE LANDING, CHARGING AND TAKEOFF

(71) Applicant: Skyyfish, LLC, Missoula, MT (US)

(72) Inventor: Orest Jacob Pilskalns, Missoula, MT (US)

(*) Notice: Subject to any disclaimer, the term of this patent is extended or adjusted under 35 U.S.C. 154(b) by 226 days.

(21) Appl. No.: 15/236,716

(22) Filed: Aug. 15, 2016

(65) Prior Publication Data

US 2017/0050749 A1 Feb. 23, 2017

Related U.S. Application Data

(60) Provisional application No. 62/205,991, filed on Aug. 17, 2015.

(51) Int. Cl.
| | |
|---|---|
| *B64F 1/36* | (2017.01) |
| *B64C 39/02* | (2006.01) |
| *B64F 1/00* | (2006.01) |
| *B64F 1/12* | (2006.01) |
| *B64D 45/08* | (2006.01) |
| *G01S 13/91* | (2006.01) |
| *G05D 1/06* | (2006.01) |
| *B60L 53/37* | (2019.01) |
| *B60L 53/14* | (2019.01) |
| *B60L 53/12* | (2019.01) |

(Continued)

(52) U.S. Cl.
CPC ............ *B64F 1/362* (2013.01); *B60L 53/12* (2019.02); *B60L 53/14* (2019.02); *B60L 53/36* (2019.02); *B60L 53/37* (2019.02); *B60L 53/60* (2019.02); *B64C 39/024* (2013.01); *B64D 45/08* (2013.01); *B64F 1/007* (2013.01); *B64F 1/12* (2013.01); *G01S 13/913* (2013.01); *G05D 1/0676* (2013.01); *B60L 2200/10* (2013.01); *B64C 2201/027* (2013.01); *B64C 2201/042* (2013.01); *B64C 2201/141* (2013.01); *B64C 2201/18* (2013.01); *B64C 2201/201* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC ........ B64C 2201/042; B64C 2201/125; B64C 39/024; B64C 2201/18; B64F 1/12; B64F 1/20; G05D 1/0676
See application file for complete search history.

(56) References Cited

U.S. PATENT DOCUMENTS

| | | | | |
|---|---|---|---|---|
| 5,832,187 | A * | 11/1998 | Pedersen | G06Q 10/06 340/577 |
| 6,193,190 | B1 * | 2/2001 | Nance | B64F 1/007 244/114 R |

(Continued)

*Primary Examiner* — Christopher D Hutchens
(74) *Attorney, Agent, or Firm* — Cotman IP Law Group

(57) ABSTRACT

An unmanned aerial vehicle (UAV) can automatically guide itself to the vicinity of a charging station of an automated landing, charging and takeoff system, which then assists with the close-range laser guidance of the UAV in order for it to dock, without the need for landing gear. The dock has locating valleys that help the booms of the UAV to self-align under the force of gravity. Electrical connections are automatically made for data download and charging. A cover may be closed over the UAV during charging.

18 Claims, 6 Drawing Sheets

(51) Int. Cl.
*B60L 53/36* (2019.01)
*B60L 53/60* (2019.01)

(56) References Cited

U.S. PATENT DOCUMENTS

| | | | | |
|---|---|---|---|---|
| 6,364,026 | B1* | 4/2002 | Doshay | A62C 3/0271 |
| | | | | 169/36 |
| 8,511,606 | B1* | 8/2013 | Lutke | B64C 39/028 |
| | | | | 244/100 R |
| 9,387,928 | B1* | 7/2016 | Gentry | B64C 39/024 |
| 9,805,372 | B2* | 10/2017 | Gong | B64C 39/024 |
| 9,828,093 | B2* | 11/2017 | Raniere | B64C 39/024 |
| 2014/0124621 | A1* | 5/2014 | Godzdanker | B64F 1/125 |
| | | | | 244/110 E |
| 2015/0097530 | A1* | 4/2015 | Scarlatti | B60L 11/1827 |
| | | | | 320/109 |
| 2016/0009413 | A1* | 1/2016 | Lee | B64F 1/007 |
| | | | | 701/16 |
| 2016/0016664 | A1* | 1/2016 | Basuni | B64C 39/024 |
| | | | | 244/17.13 |
| 2016/0039541 | A1* | 2/2016 | Beardsley | B60L 11/1816 |
| | | | | 701/2 |
| 2016/0257423 | A1* | 9/2016 | Martin | B64F 1/00 |
| 2016/0257424 | A1* | 9/2016 | Stabler | A63H 27/12 |
| 2016/0304217 | A1* | 10/2016 | Fisher | B60L 11/1809 |
| 2016/0364989 | A1* | 12/2016 | Speasl | G08G 5/0034 |
| 2017/0015438 | A1* | 1/2017 | Harding | B64F 1/00 |
| 2017/0129603 | A1* | 5/2017 | Raptopoulos | B64C 39/024 |
| 2017/0190423 | A1* | 7/2017 | Salgueiro | B64C 39/024 |
| 2017/0217323 | A1* | 8/2017 | Antonini | B60L 11/1816 |
| 2017/0225802 | A1* | 8/2017 | Lussier | B64F 1/222 |
| 2017/0247110 | A1* | 8/2017 | Chappell | B64C 39/024 |
| 2017/0301220 | A1* | 10/2017 | Jarrell | H04W 4/70 |

* cited by examiner

AUTONOMOUS SYSTEM FOR UNMANNED AERIAL VEHICLE LANDING, CHARGING AND TAKEOFF

TECHNICAL FIELD

This application relates to unmanned aerial vehicles (UAV). More specifically, it relates to an automated landing, charging and takeoff system for UAVs.

BACKGROUND

UAVs require power to fly, which is usually provided by batteries. Longer flight times increase the usefulness of a UAV, especially for such activities as surveillance, deliveries, and aerial photography. A small UAV (SUAV) typically uses lithium polymer (LiPo) batteries, which can be charged quickly.

This background information is provided to reveal information believed by the applicant to be of possible relevance to the present invention. No admission is necessarily intended, nor should be construed, that any of the preceding information constitutes prior art against the present invention.

SUMMARY OF INVENTION

Small UAVs with an Automated Charging System (ACS) component and an Automated Takeoff and Landing System (ATLS) component of an automated landing, charging and takeoff system can be controlled remotely and operated completely autonomously based on programming control. The completely autonomous, automated landing, charging and takeoff system of the invention disclosed herein can either operate on demand or continuously based on the mission for the SUAV. The system provides a way to extend flight time by automating the charging of a SUAV. It also provides a way to use multiple SUAVs to simulate an extended flight time of a single SUAV. For example, as one SUAV is flying on a mission, a second one can be charging at a base station, waiting to take off and replace the one in flight, essentially creating an uninterrupted, or minimally interrupted service. The system guides the SUAV to the base station, where it lands and charges before taking off to continue its mission.

Disclosed herein is a base station for an unmanned aerial vehicle (UAV) comprising: a receiving structure configured to receive the UAV; a plurality of sensors configured to detect the UAV; a transmitter configured to transmit a signal to the UAV in response to said sensors detecting the UAV, said signal enabling the UAV to align with the base station and land on the receiving structure; and a battery charger that charges a battery of the UAV when the UAV is in the receiving structure.

In some embodiments, the sensors are laser detectors, which may be located on an upper surface of a plurality of walls of the base station. In some embodiments, when one of said sensors detects the UAV, said signal includes location information of the wall on which said one sensor is located.

In some embodiments, the transmitter is configured to transmit, before transmitting said signal, a prior signal that instructs the UAV to switch on downward-pointing lasers that are located on the UAV and fly in a pattern over the base station.

In some embodiments, the receiving structure comprises a plurality of troughs each configured to receive a different boom of the UAV. In some embodiments, the receiving structure comprises a top surface having a plurality of valleys, each valley corresponding to a different boom of the UAV, and the valleys are sloped steeply enough and have a low enough coefficient of friction that the booms are directed down the valleys by gravity.

In some embodiments, the base station has a plurality of locks, each lock configured to hold a different boom of the UAV in position in the receiving structure. In some embodiments, each lock moves from an unlocked position below a top surface of the receiving structure to a locked position above the surface and around the corresponding boom.

Further disclosed herein is a system for an unmanned aerial vehicle (UAV) to automatically land, charge and take off comprising a UAV having a plurality of downward-pointing lasers and a base station. The base station comprises: a receiving structure configured to receive the UAV; a plurality of sensors configured to detect the UAV, wherein said sensors are laser detectors; a transmitter configured to transmit a signal to the UAV in response to said sensors detecting the UAV, said signal enabling the UAV to align with the base station and land on the receiving structure; and a battery charger that charges a battery of the UAV when the UAV is in the receiving structure.

In some embodiments of the system: the UAV has booms with a round cross-section; the lasers are mounted on the booms; the receiving structure is a cradle that comprises a plurality of troughs each configured to receive a different boom of the UAV; the cradle comprises a top surface having a plurality of valleys, each valley having one of said troughs; the valleys are sloped steeply enough and have a low enough coefficient of friction that the booms are directed down the valleys and into the troughs by gravity; the base station further comprises a plurality of locks, each lock configured to hold a different boom of the UAV in position in one of said troughs; and each lock moves from an unlocked position below the top surface of the cradle to a locked position above the surface and around the corresponding boom.

Still further disclosed is a method for an unmanned aerial vehicle (UAV) to automatically land, charge and take off comprising the steps of: (a) a UAV, having a plurality of downward-pointing lasers, hovering over a base station comprising: a receiving structure configured to receive the UAV; a plurality of sensors configured to detect the UAV, wherein said sensors are laser detectors; a transmitter configured to transmit a signal to the UAV in response to said sensors detecting the UAV, said signal enabling the UAV to align with the base station and land on the receiving structure; and a battery charger that charges a battery of the UAV when the UAV is in the receiving structure; (b) the UAV receiving a command from the base station to switch on the lasers and fly in a pattern above the base station; (c) the UAV switching on the lasers; (d) the UAV flying in a pattern above the base station; (e) the base station detecting the lasers; (f) the base station transmitting said signal to the UAV; (g) the UAV landing on the receiving structure; (h) the base station charging the UAV; and (i) the UAV taking off.

In some embodiments, the method includes a satellite detecting a lightening strike and a location of the lightening strike; transmitting said location to the UAV; the UAV inspecting the location; and the UAV reporting a result of said inspecting to a fire-fighting control center.

In some embodiments, the method includes a smartphone application receiving a request from a user; transmitting the request and a location of the user to a control center of a fleet of said UAVs; and the control center dispatching one of said UAVs to said location.

BRIEF DESCRIPTION OF DRAWINGS

The following drawings illustrate embodiments of the invention, which should not be construed as restricting the scope of the invention in any way.

DESCRIPTION

A. Glossary

UAV—Unmanned aerial vehicle, or drone.
SUAV—Small unmanned aerial vehicle. SUAVs typically use lithium polymer (LiPo) batteries, which can be charged quickly.
ACS—Automated charging system component of an automated landing, charging and takeoff system. The ACS typically includes a receiving structure and charger, and an automated mechanism for connecting the charger to the SUAV, unless charging is wireless.
ATLS—Automated takeoff and landing system component of an automated landing, charging and takeoff system. The ATLS typically includes sensors on a base station, lasers on the SUAV and a radio communication connection between the SUAV and the base station. Communications between the two enable the SUAV to accurately align itself with the base station in order to land on it.
Base Station—Container that cradles, protects, charges and communicates with an SUAV.
Boom—An arm extending from the airframe of a UAV or SUAV, holding at its outer end a motor with an attached propeller or rotor.

The term "firmware" includes, but is not limited to, program code and data used to control and manage the interactions between the various components and modules of the system.

The term "hardware" includes, but is not limited to, the mechanical and electrical components of the SUAV, ATLS and ACS, the physical housing for a computer as well as the display screen if any, connectors, wiring, circuit boards having processor and memory units, power supply, and other electrical components.

The term "software" includes, but is not limited to, program code that performs the computations necessary for calculating and optimizing control of the SUAV, managing its charging, and managing input and output data to and from the SUAV.

The term "module" can refer to any component in this invention and to any or all of the features of the invention without limitation. A module may be a software, firmware or hardware module, and may be located in a SUAV, a base station or a remote control unit.

The term "system" when used herein without qualification generally refers to the overall system of the disclosed invention, i.e. a Completely Autonomous System for SUAV charging using an ACS component of the system and an ATLS component of the system, unless it is clear from the context that it means otherwise.

B. Overview

Figure 1:
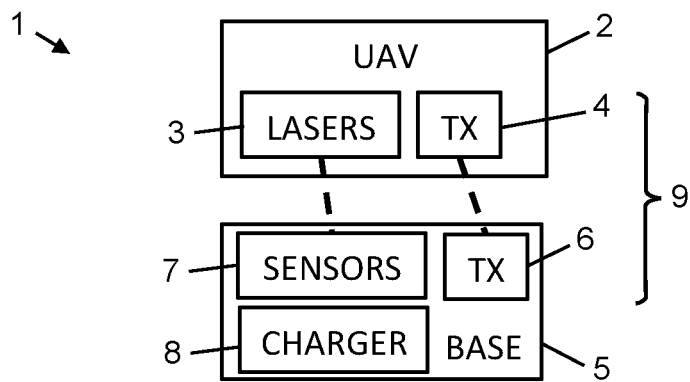
FIG. 1 is a simplified schematic block diagram of the ALTS component and the ACS component of the automated landing, charging and takeoff system.

Referring to FIG. 1, a simplified overview of the system 1 for automated landing, charging and takeoff is shown. SUAV 2 is equipped with lasers 3 that are aimed downwards when the SUAV is in a horizontal orientation. The SUAV 2 is also equipped with a transmitter 4 for communicating with the base station 5, which also has a transmitter 6. The base station 5 also has sensors 7 for sensing the lasers 3 on the SUAV 2 and a battery charger 8 for charging the SUAV 2. The lasers 3, transmitters 4, 6 and sensors 7 form the automated landing and takeoff system (ATLS) 9, and can be considered as the primary laser guidance system. The charger 8, connections (e.g. 71, 76, FIG. 8) between the charger and the SUAV, and receiving structure (22, FIG. 2) form the automated charging system (ACS).

When the SUAV 2 is close to the base station 5, communication occurs between the SUAV and the base station, and the SUAV is guided to land on the base station via positional feedback from the sensors 7 as they detect the lasers 3.

C. Exemplary Embodiment

Figure 2:
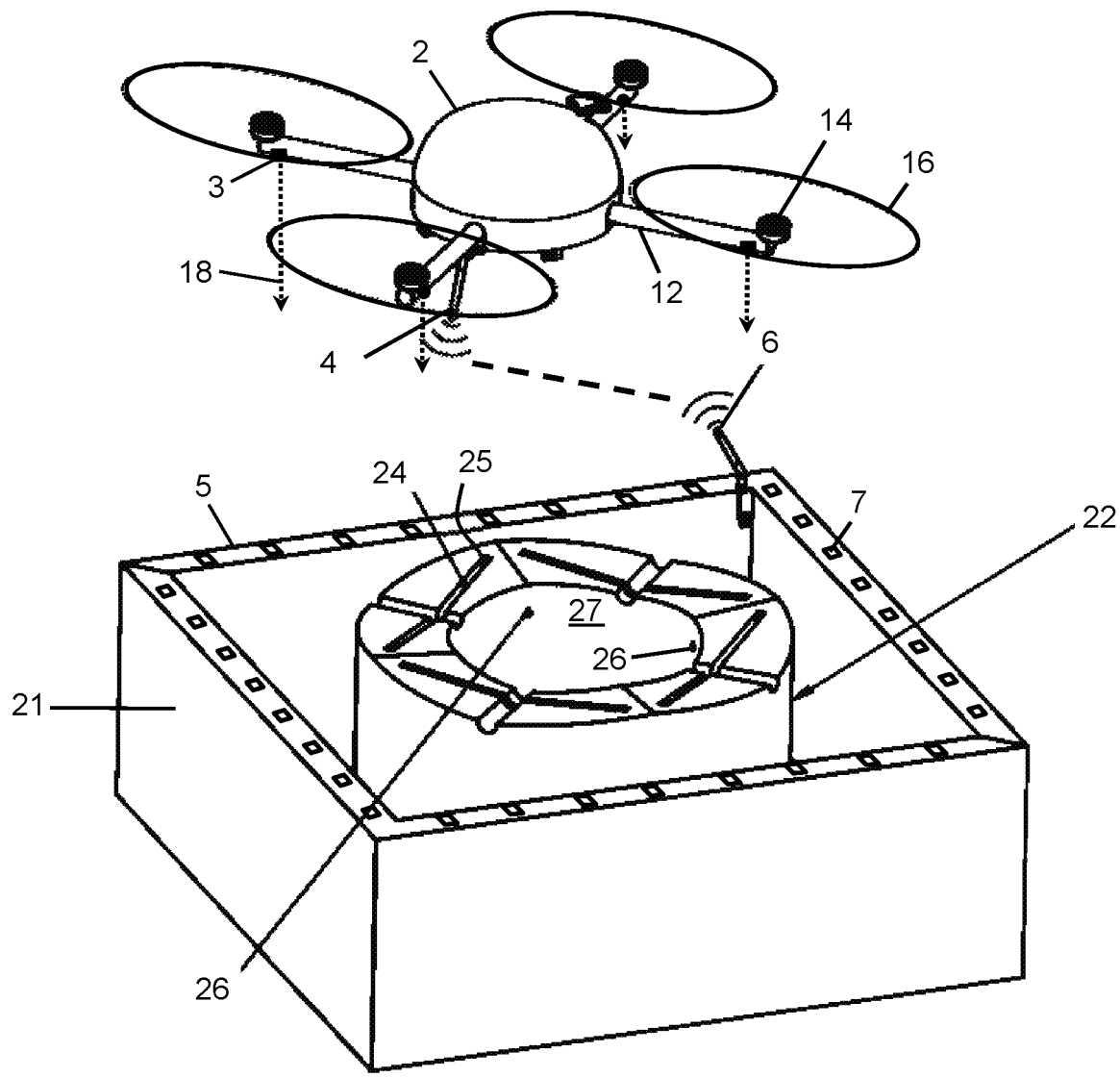
FIG. 2 shows a multi-rotor unmanned aerial vehicle hovering over an ACS component of an automated landing, charging and takeoff system, according to an embodiment of the present invention.

Referring to FIG. 2, a SUAV 2 is shown flying above a base station 5 of the ACS component of an automated landing, charging and takeoff system 1 of the present invention. The SUAV 2 has four booms 12, each boom mounted with a motor 14 for driving a rotor 16. Lasers 3 are mounted on the booms 12 of the SUAV 2 and are directed to emit light or infrared radiation downwards along arrows 18.

The base station 5 has four walls 21 on the top surface of which the sensors 7 are mounted. The base station 5 includes a battery charger and an internal receiving structure 22, which has one or more surfaces for supporting the SUAV and incorporated capture and/or locking mechanisms 24, which slide in guiding slots 25. The internal receiving structure or cradle 22 houses micro-alignment mechanisms 26 and a secondary laser guidance system for repositioning the UAV 2 in the cradle after it has landed in it. The alignment mechanisms 26 project from the inner surface 27 of the cradle 22.

The base station 5 of the ACS component and the SUAV 2 communicate via radio transmission when the SUAV reaches a designated range from, and/or elevation above, the ACS component. The SUAV and the base station 5 of the ACS component need to have a direct, low bandwidth, real time communication link on a reliable connection, at least when the two are in the vicinity of each other. Communications between the base station 5 and the SUAV 2 are effectuated via transmitters 4, 6 on the SUAV and base station respectively. The signals that the base station 5 sends to the SUAV 2 enable the SUAV to align with the base station and land on the cradle 22.

The SUAV 2 uses a GPS (Global Positioning System) guidance system for general navigation. To keep the system affordable, the GPS receiver has a limited accuracy, for example of approximately 1 meter, meaning that the GPS coordinates obtained will be within one meter of the actual global location of the SUAV. Thus the system must either account for the inaccuracy of the GPS or correct the coordinates obtained from it.

Figure 3:
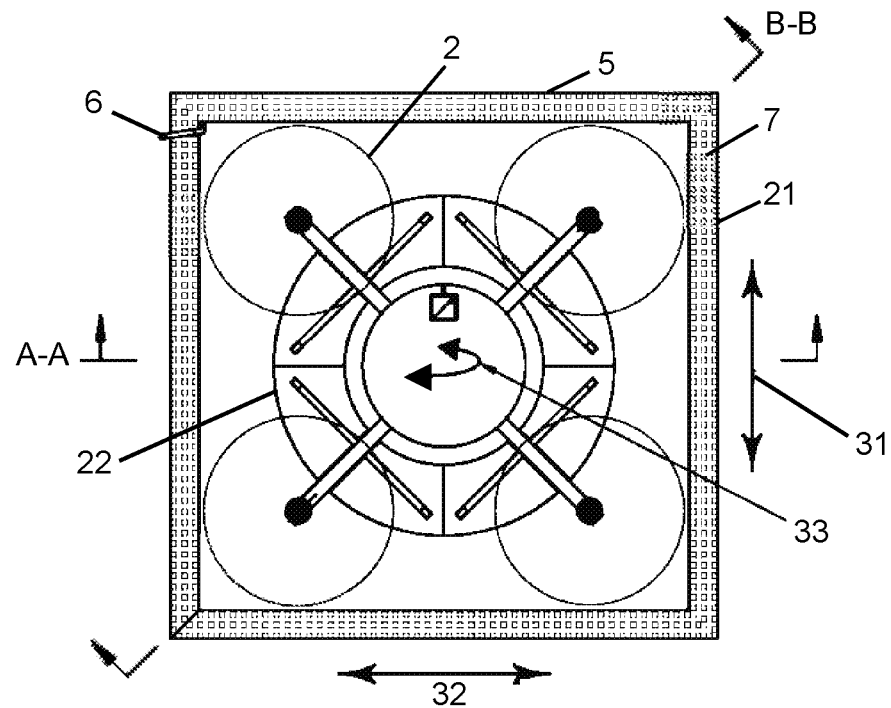
FIG. 3 shows a top view of a multi-rotor unmanned aerial vehicle centered over and landed on the ACS component of the system, according to an embodiment of the present invention.

FIG. 3 shows the SUAV 2 landed in the base station 5. The view would be the same if the SUAV were hovering directly above the base station and aligned with it. The size of the base station 5 of the ACS component is such that it can accommodate the largest rotor blade propellers expected to be used on the SUAVs, including an allowance for clearance during takeoff and landing. In other words, the base station has a perimeter with internal dimensions that accommodate every rotor on the SUAV. There are sensors 7 located on the top edges or surfaces of the walls 21 of the base station 5, and are aimed vertically upwards when the base station is on a horizontal surface. The sensors 7 are able to detect the SUAV and may be laser detectors, for example. Correspondingly, the sensors 7 may be laser detectors or other optical detectors. The SUAV uses lasers, GPS, and/or sonar etc. to locate its position relative to the location of the base station sensors 7. The SUAV is able to translate in directions 31, 32 and rotate back and forth in direction of arrows 33 as required to maintain a laterally and rotationally aligned, level orientation above cradle 22 of the base station 5 during landing.

Figure 4:
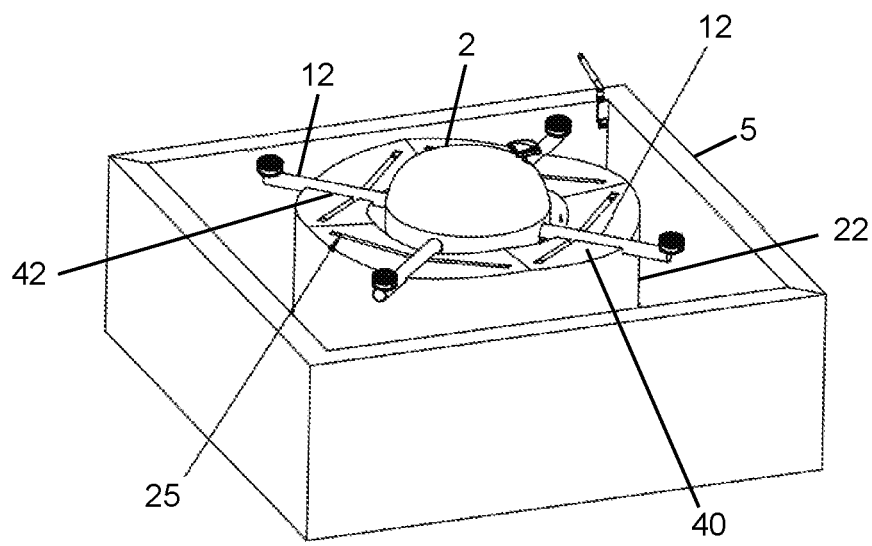
FIG. 4 shows a perspective view of a multi-rotor unmanned aerial vehicle landed on the ACS component of the system, according to an embodiment of the present invention.

FIG. 4 shows the SUAV 2 without the rotors for clarity. After the SUAV 2 has positioned itself using information from the sensors 7, it lands onto the internal receiving structure 22 (or cradle) of the base station 5. Each quadrant of the receiving structure forms a valley 40, with each side of the valley sloping downwards to a trough 42 that receives one of the booms 12 of the SUAV. There is one trough for each boom. The valleys are sloped steeply enough and have a low enough coefficient of friction that the booms 12 are directed down the valleys 40 by gravity. The cradle 22 is therefore configured to receive the SUAV 2. The angled sides of the valley 40 can compensate for minor misalignments of the SUAV 2 during the landing process, allowing the booms 12 of the SUAV to slide down the sides of the valleys into the receiving troughs 42 via self dead weight under the force of gravity. The SUAV 2 has round-section booms 12 made of carbon fiber, which helps the booms 12 to fall down the valleys 40. At least the top surface of the internal receiving structure 22 is made of a plastic that allows the SUAV booms 12 to easily slide upon the surface.

As shown, the booms 12 are seated in the receiving troughs 42. There is a trough 42 and corresponding valley 40 for each boom 12 of the SUAV 2. Guide slots 25 accommodate boom locks for locking the booms 12 in position after the SUAV 2 has landed. In this view, the boom locks are not visible because they are retracted during the landing process.

In addition, the internal receiving structure 22 removes the need for landing gear, which represents a weight reduction improvement.

Figure 5:
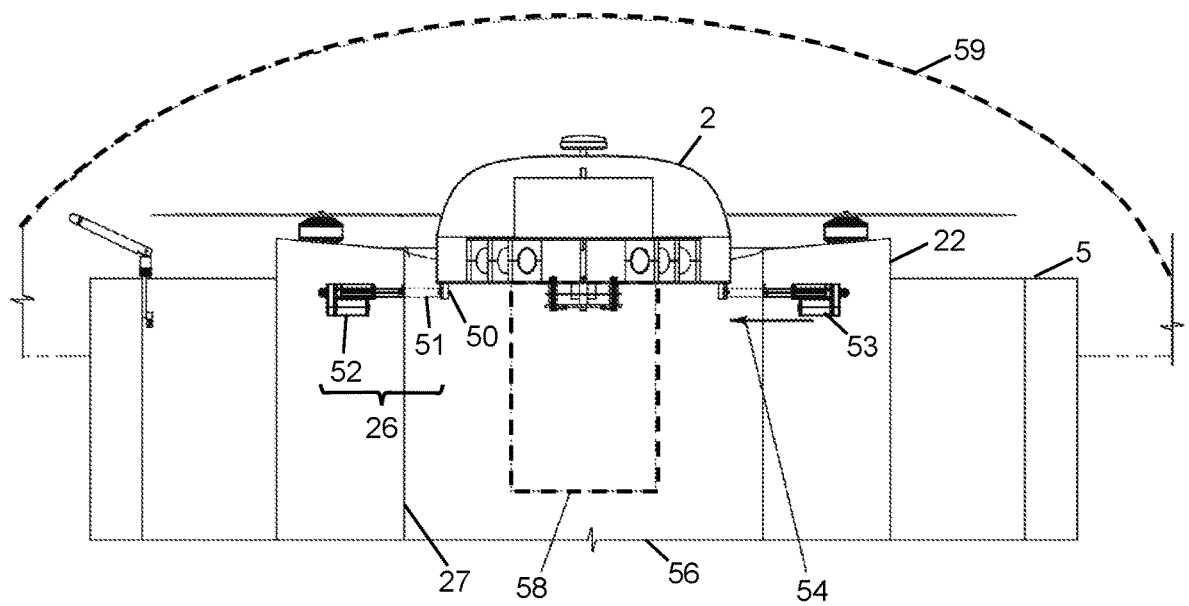
FIG. 5 is of section A-A taken from FIG. 3, showing micro-adjustment features for positioning the UAV in the ACS component of the system.

FIG. 5 is a cross-section of the SUAV 2 when it is located in the base station 5, which include actuators to adjust the position of the SUAV when it is located in the troughs. Micro-alignment guides 50, which are located on the under frame of the SUAV 2, cooperate the micro-adjustment mechanisms 26. Each micro-adjustment mechanism 26 includes a ram 51 operated by a linear actuator 52, which is mounted on the internal receiving structure 22. The linear actuator ram 51 strokes out from the inner wall 27 of the cradle 22 and engages with the alignment guides 50 on the SUAV 2. For example, actuator 53 produces movement in the direction of arrow 54. The amount of X-Y adjustment imparted by the linear actuators 52, 53 is controlled based on positioning feedback from the secondary laser guidance system, via further sensors in the base station 5.

The internal receiving structure 22 also contains a cavity or room 56 in the center for a gimbal 58 or any device that the SUAV 2 is carrying. Optionally, a door or cover 59 is automatically closed over the SUAV 2 after it has landed, protecting the SUAV from weather and unwanted visitors during the charging process. When the booms 12 seat into the troughs 42, a sensor is engaged to trigger the automatic closure of the cover 59. After charging, and when the SUAV 2 is ready to take off, the cover 59 automatically opens. Note that there is no landing gear on the SUAV 2.

Figure 6:
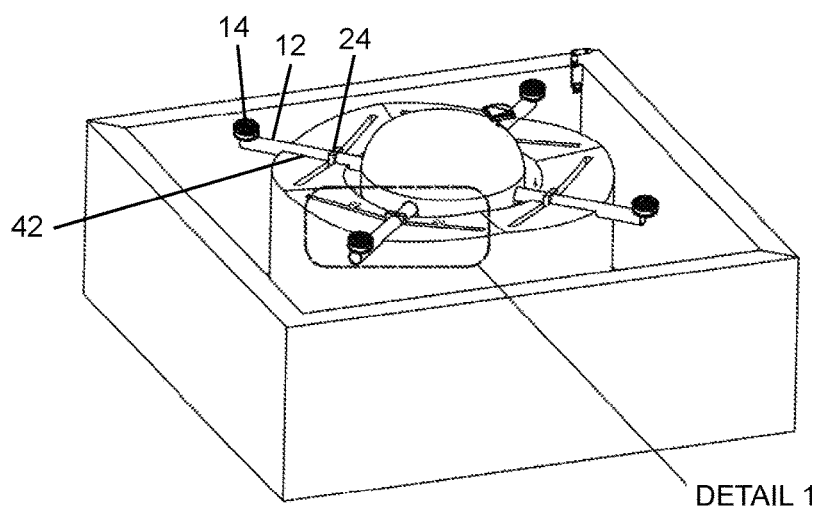
FIG. 6 shows a clamping mechanism for retaining a UAV in place on the ACS component of the system.

FIG. 6 shows the SUAV 2 clamped in position via its booms 12 being held in the receiving troughs 42 by locking mechanisms 24. For clarity, the rotors of the SUAV 2 are not shown on the motors 14.

Figure 7:
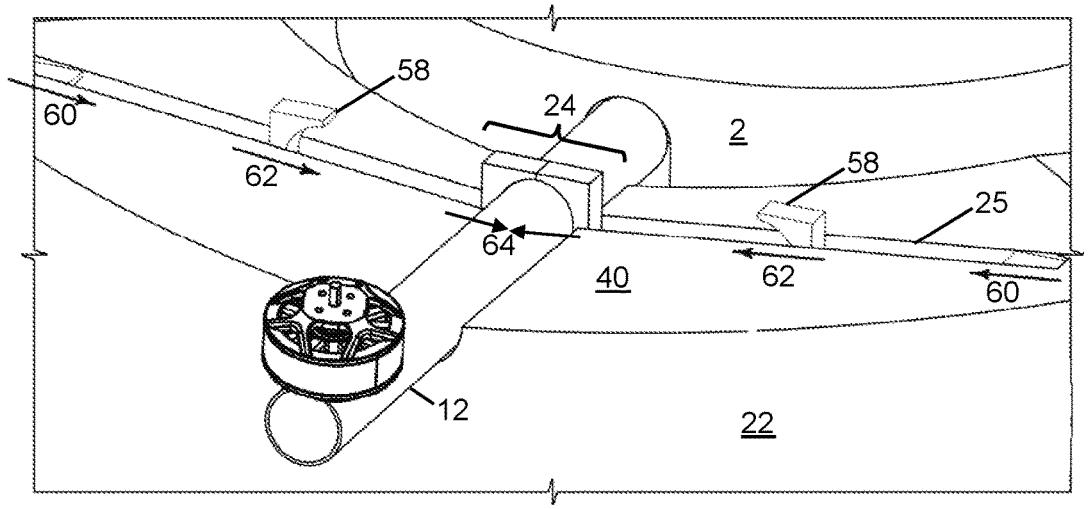
FIG. 7 is a close up view of Detail 1 of FIG. 6

FIG. 7 shows more detail of the clamping or locking mechanisms 24. There is one lock 24 for each boom 12 of the SUAV 2. The locking mechanism 24 includes two embedded locking clamps 58, which are engaged on a linear actuated slide track, clamping the SUAV booms 12. There are two clamps 58 for each boom 12. In this view, the clamps are shown in an outermost, recessed position 60 in the guide slot 25, a mid-way position 62, in which they are partially projecting above the upper surface of the valley 40, and a closed position 64. In the closed position, the clamps 58 are engaged around the boom 12. Each lock moves from an unlocked position below the top surface of the cradle to a locked position above the surface and around the corresponding boom.

Figure 8:
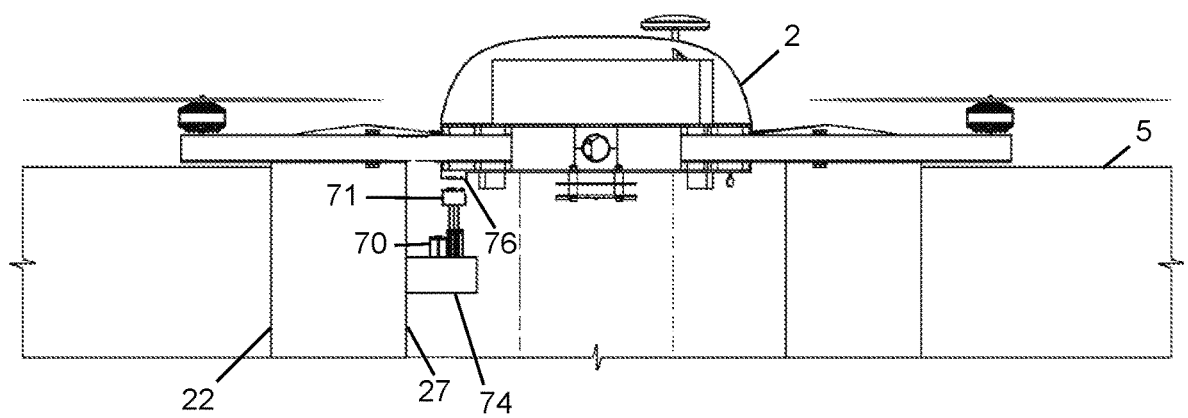
FIG. 8 is view along section B-B of FIG. 3, showing the charging switch, plug and actuator of the ACS component of the system.

FIG. 8 shows the SUAV 2 prior to data transfer and recharging. Charging would occur after data has been downloaded, if any. There is a linear actuator 70 and charging plug 71 mounted on platform 74 projecting from the inner surface 27 of the internal receiving structure 22. The SUAV 2 has a battery switch and connector assembly 76 on its under frame. Upon landing, the actuator moves the male plug 71 of the base station upwards so that it engages with the female cooperating connector 76 on the SUAV. The connector is for both data transfer and charging. After data download has been completed, the battery switch of the SUAV 2 is operated to deactivate the battery circuit of the SUAV and activate the charging circuit. A sensor and relay on the base station 5 control the battery charging circuits of the base station to enable charging of the SUAV 2.

The system includes software, firmware and/or hardware working together with each other. It includes an input mechanism for the user to visually or otherwise program a mission by specifying a flight plan and one or more mission operations, such as focusing a camera on points of interest; mapping; search and rescue; damage assessment; etc. Such a system may be used for security purposes, for example, to provide additional viewpoints that are not obtainable with fixed security cameras. They may be used, for example, for monitoring all around ships that are moored at a wharf.

Starting from when the SUAV is in the air, once a landing command has been initiated by the navigation and control module, the system operates using its laser-guided hardware and software control system.

Figure 9:
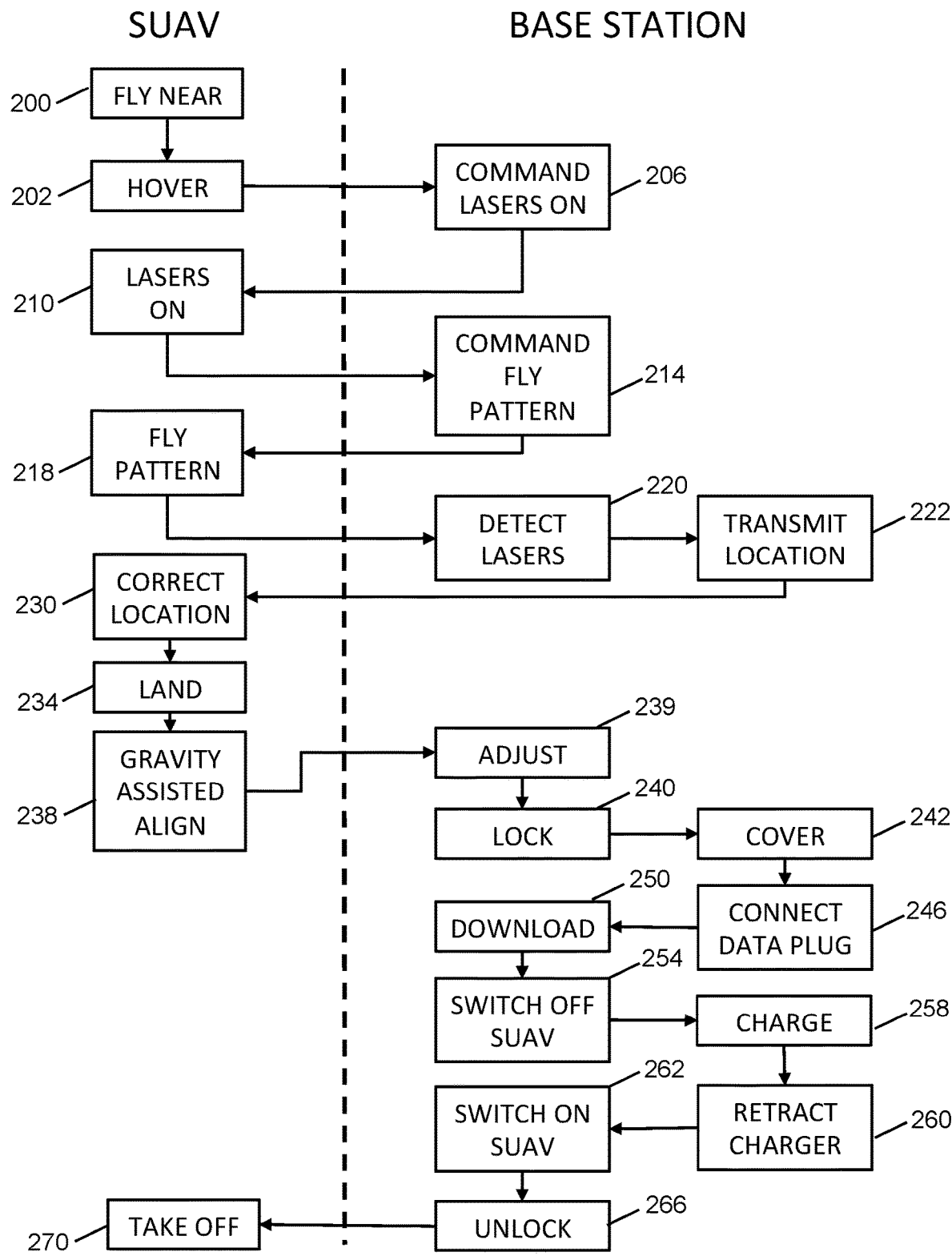
FIG. 9 is a flowchart of a process a SUAV and base station perform as part of an automated landing, charging and takeoff system.

FIG. 9 shows the process steps of the automated landing, charging and takeoff system that the SUAV 2 and base station 5 undergo in cooperation with each other. In step 200, the SUAV 2 flies to nearby the base station 5, using the GPS coordinates of the base station 5 and the SUAV's onboard GPS. In step 202, the SUAV 2 hovers at a constant safe height above the base station 5. Since the base station 5 and the SUAV 2 are in wireless communication with each other, the base station in step 206 issues a command to activate the lasers on the SUAV, which are lower power lasers (e.g. infra-red or red diode lasers). The lasers 3 are fixed on one or more of the SUAV 2 booms 12 and they point directly down from known locations on the booms of the SUAV. Upon receipt of the command from the base station, the SUAV 2 switches on its lasers, in step 210. The SUAV is then instructed by the base station 5, in step 214, to fly in a small pattern over the landing area. The pattern may be a predetermined pattern and it should be large enough to pass over the base station 5. The landing area has a rectangular or square sensor configuration on the outside edge of the base station 5. When the SUAV 2 flies in the pattern, in step 218, it passes over the sensors 7 on the base station 5. In step 220, the sensors 7 of the base station detect the lasers 3 of the SUAV 2, and the base station 5 then in step 222, transmits an exact location for that axis (i.e. the side of the base station that detected the lasers) back to the SUAV. That is, when at least one of the sensors 7 detects the SUAV 2, the signal sent from the base station 5 to the SUAV includes location information of the wall 21 on which that one sensor is located. The SUAV then, in step 230, corrects its positions in both latitude and longitude, and angular orientation, and slowly descends into the cradle 22 of the base station 5 formed by the valleys 40 in each quadrant. The SUAV 2 lands in the base station 5 in step 234 and then, if necessary, undergoes slight positional adjustment under the force of gravity, in step 238. This occurs if, for instance, the SUAV lands with its booms 12 outside the receiving troughs 42 but within the guiding valleys 40, in which case the weight of the SUAV will cause its booms to slide down the valleys until they fall into the receiving troughs. The base station 5 then locks the SUAV into place sliding its clamps 24 onto and around the booms 12, in step 240. Since the SUAV 2 has multiple lasers 3, the system can find the correct orientation for landing, so that the charging system can be lined up.

Optionally, in step 242, a door 59 is shut or a cover over the SUAV 2 is automatically activated, protecting the SUAV from weather and unwanted visitors during the charging process. In step 246, the SUAV's charging and data plug 76 are connected to a mating plug 71 as per FIG. 8. The mating plug 71 is connected using a linear actuator 70. If there is any data to be retrieved from the SUAV 2, it is downloaded in step 250, before charging takes place. After the data, if any, has been downloaded, the SUAV electronics are switched off by the base station 5 and disconnected, in step 254, so that the charging of the main batteries of the SUAV does not overload the SUAV's electronics system. Charging occurs in step 258. After the charging is complete, the connector for the charging system is retracted under control of the linear actuator 70, in step 260. The SUAV electronics are reactivated in step 262 by re-engaging the switch that was previously switched off (in step 254). A switch sensor on the base station 5 relays this information to the base station control board. As a result, i.e. immediately after reactivating the SUAV electronics, the boom locks are released in step 266 and the cover 59 is opened. The SUAV is now ready for a takeoff, which it does in step 270. Once initiated, the SUAV hovers to a safe height to then continue its mission or receive its next command.

D. Variations

In other embodiments within the purview of the present invention, a fleet of three SUAVs may be used with two base stations of the system, for example if it takes twice as long to charge an SUAV as it takes to discharge its batteries. In other embodiments, many SUAVs may share many base stations.

A single SUAV may use multiple charging stations. For example, this may permit missions to remote locations that may not be reachable using a single charge. Charging stations may be powered by mains electricity, solar power, wind power, a diesel generator, etc.

Figure 10:
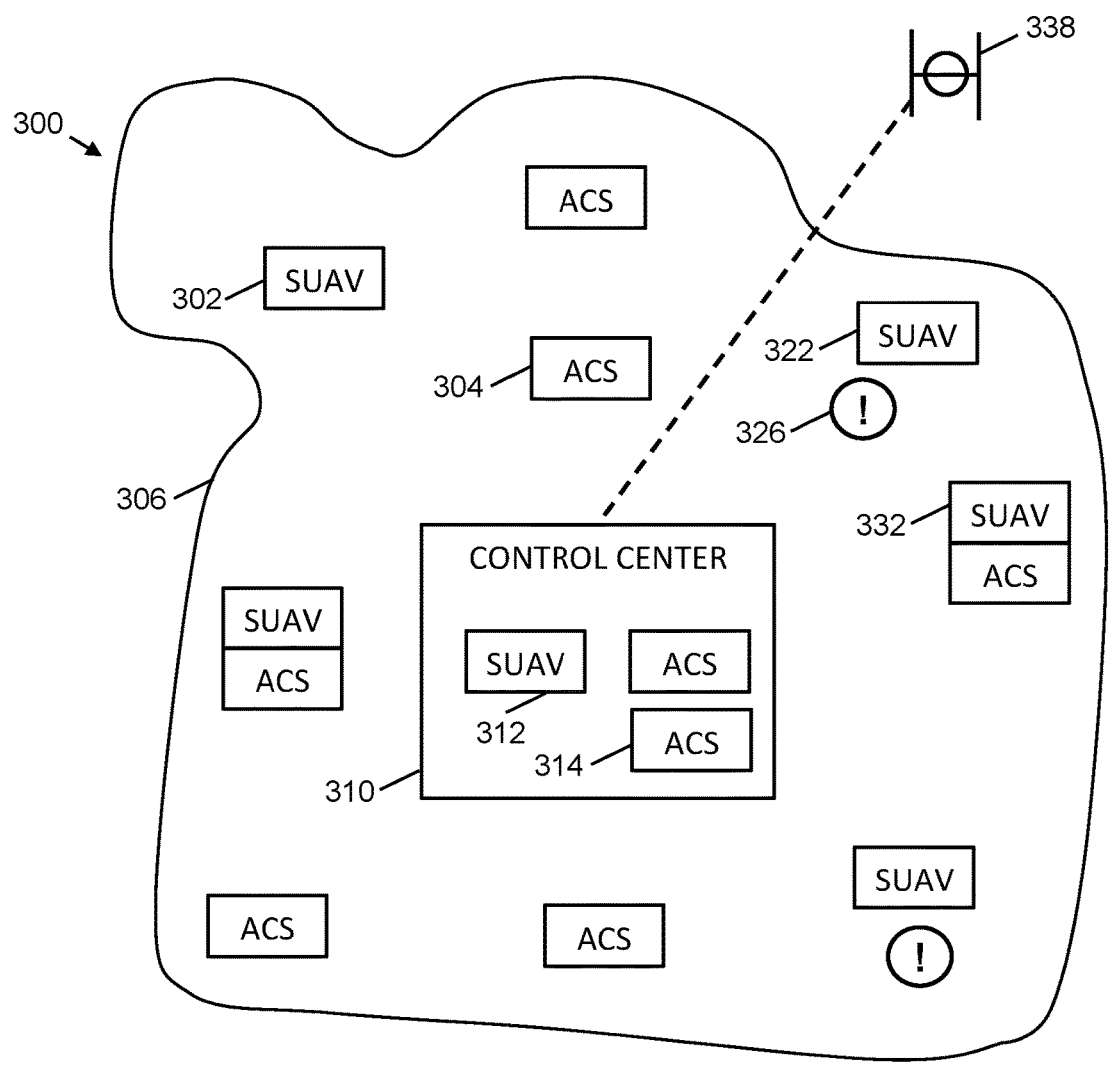
FIG. 10 is a fleet of SUAVs according to an embodiment of the present invention.

FIG. 10 shows an array or fleet 300 of SUAVs 302 and ACSs 304 deployed within a boundary 306, which may be a city boundary or a forest boundary, for example. A control center 310 manages the fleet of SUAVs and ACSs and may itself also accommodate one or more SUAVs 312 and/or ACSs 314. At any moment in time one or more SUAVs 322 may be inspecting an incident 326, which may be a crime, an accident, a fire, etc. Also, any of the SUAVs 332 may be charging on an ACS. Other SUAVs may be flying to an incident or just surveying the area in general. There is not necessarily a 1:1 correspondence between the number of SUAVs and the number of ACSs. A satellite 338 may be monitoring the area within boundary 306, and may transfer data relating to the area to the control center 310.

Figure 11:
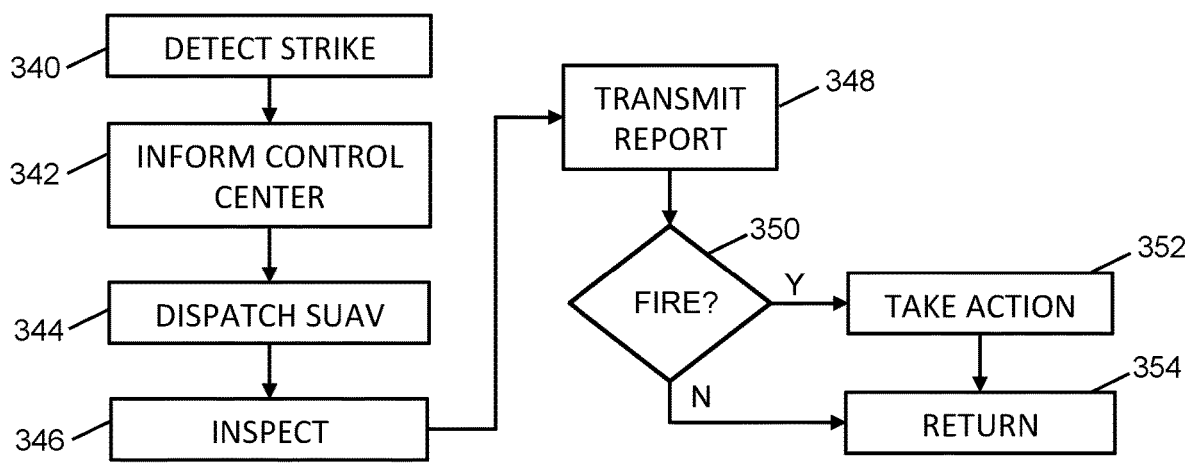
FIG. 11 is a flowchart of a process that a fleet of SUAVs takes to fight a forest fire.

In some embodiments, control of the flight of the SUAV is based on external stimuli, such as lightening. A use case would be in the Forest Service, for example, as shown in the flowchart of FIG. 11. In this case, a fleet of multiple SUAVs and multiple ACSs is installed in, say, a national forest. Satellite(s) are programmed to detect and map lightening strikes as in step 340. In step 342, the satellite(s) send information about the strikes including details of latitude, longitude, altitude and energy signature to a control center for the fleet of SUAVs and ACSs. Communication from the satellite(s) may be via satellite or cellular connections.

Upon the control center receiving information about a lightening strike, the nearest SUAV is dispatched, in step 344, and takes off within a predetermined amount of time or at such a time that it can arrive at the location of the strike within a predetermined time to perform a reconnaissance of the area. The amount of time may be determined by empirical data relating to the effectiveness of when best the area of a lightening strike should be observed for accurately determining the start of a potentially dangerous forest fire. Upon arriving at the location of the lightening strike, the SUAV inspects the site with a thermal camera, in step 346. The SUAV has image recognition software which is programmed to detect whether there is a fire or not, and if there is, the extent and intensity of it. After the SUAV has determined whether there is a fire or not, it contacts the control center to transmit a report of the news, in step 348, and optionally sends information about the extent and/or intensity of the fire if there is one.

The SUAV may instruct the control center to send firefighting resources if necessary, or personnel at the control center who receive the information about the fire may determine what resources to send to fight the fire. Some resources, for example unmanned resources, may be sent automatically. For example, the SUAV calls in a larger UAV that carries flame retardant. In other cases, the reconnaissance SUAV also has its own flame retardant, and upon detecting that there is a fire in step 350, it takes action in step 352 by releasing the retardant onto the fire. After taking action, the SUAV returns to an ACS in step 354 for recharging. In some embodiments, the reconnaissance SUAV may call on other inspection SUAVs nearby to help, for example if the fire is already large, it may be necessary for multiple SUAVs to map it. The reconnaissance SUAVs may call on the other SUAVs directly or via the control center. Alternately, or as well, the other inspection SUAVs may carry flame retardant that they too apply to the fire. If, in step 350, there is no fire, the SUAV returns directly to an ACS in step 354, or moves on to a subsequent mission.

In some embodiments, a fleet of SUAVs may be used for persistent surveillance. For example, a fleet of multiple SUAVs and ACSs is installed in a city in order to provide constant coverage of the area. The constellation of SUAVs may provide coverage that is, for example, based on location-based crime statistics, such that greater amounts of data are collected from high-risk areas. The SUAVs are programmed to react based on police reports and/or emergency calls to the police, such as calls regarding a break-in at a particular address. The SUAVs may be programmed to collect data regarding a riot, a road traffic accident, a fire, a flood, an earthquake, etc. In such cases, the SUAVs collect data, such as video footage, from safe distance. Other services can be piggy backed upon the use of SUAVs for city surveillance, for example, governments could sell news footage or mapping data. In some embodiments, the SUAVs may be used for detecting the speed of vehicles and for automatically issuing speeding tickets, or for informing the nearest police officer. Video evidence of the speeding vehicle may be recorded by the SUAV.

A city-based fleet of surveillance SUAVs may be configured to provide assistance to citizens. A smartphone app allows for users to call into the SUAV fleet, for example, when a person is afraid of an attack, an SUAV flies to the person with spot lights to illuminate and/or video record the person and surrounding area, and/or follows the person home. The call may be initiated be the user tapping a panic button on the smartphone, which communicates with the control center via one or more networks and servers. The GPS in the smartphone automatically provides the location of the user to the control center for the fleet of SUAVs so that the control center can dispatch the nearest available SUAV. In other situations, an SUAV may be dispatched upon the user making a 911 call, either automatically or at the discretion of an operator.

Fleets of SUAVs may be equipped with ADS-b (Automatic Dependent Surveillance—Broadcast), the electronic broadcast protocol which aircraft use to determine and announce their position to air traffic control systems in order to reduce the probability of collision.

In other embodiments, a fleet of SUAVs may be used for news coverage.

In other embodiments, a fleet of SUAVs may be installed in private businesses or residences. The SUAVs may be rented or the businesses and residences may provide a share of any profits that are generated from the sale of the SUAV's services.

In general, unless otherwise indicated, singular elements may be in the plural and vice versa with no loss of generality. The gender of the electrical connectors, where mentioned, may be switched.

All parameters, dimensions, materials, and configurations described herein are examples only and actual values of such depend on the specific embodiment.

Steps in the flowchart may be performed in a different order and/or by a different component of the system.

Data may be downloaded via Bluetooth™ or other wireless protocol. Charging may be wireless, i.e. by inductive charging.

Connectors for data download and charging may be combined into one connector or they may be separate connectors. Separating the connectors will reduce the likelihood of electromagnetic interference that may corrupt the data during transfer. In some embodiments, data download and charging may occur simultaneously.

Guidance may be via other techniques, such as computer vision or near field radio-frequency signal strength. Lasers may be pointing in other directions besides straight downwards. Sensors on the base station may be in different location and/or pointing in a different direction. Lasers may be mounted on the base station and the corresponding sensors mounted on the SUAV.

Other angles of the valley sides may be used, and other low-friction surfaces may be used for the booms and the top surface of the cradle. While the receiving structure has been largely referred to as a cradle, other shapes and structures are possible, such as a platform.

In some embodiments, the laser alignment components are replaced or partially replaced by a precision RTK (Real-Time Kinetic) GPS system. If partially replaced, the lasers and corresponding sensors are used for rotational adjustment (yaw) and/or elevation. The rotational adjustment needed is likely to be slight. If fully replaced, the rotational and/or elevational alignment that will still be needed can be achieved using sonar.

Instead of the ACS supplying electrical power to the UAV, other sources of power may be provided. For example, hydrogen refueling may be provided by the ACS as an option or instead of providing electricity, or even traditional fuels may be provided to a non-electrical battery.

Throughout the description, specific details have been set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware, firmware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

Although the present invention has been illustrated principally in relation to SUAVs, it has application in respect of other types of UAV, including larger UAVs that may in future be powered by rapidly rechargeable batteries and/or supercapacitors.

It will be clear to one having skill in the art that variations to the specific details disclosed herein can be made, resulting in other embodiments that are within the scope of the invention disclosed and claimed.

The invention claimed is:

1. A base station apparatus for docking and downloading data from an unmanned aerial vehicle (UAV) comprising:
   (a) a landing platform configured to receive and dock a UAV, wherein the UAV comprises an airframe with one or more booms, said landing platform having a centrally located cradle and one or more elevated walls on an outside perimeter of the landing platform defining a four-sided sensor configuration;
   (b) a primary landing guidance system comprising:
      i) an array of laser sensors mounted on said one or more elevated walls, wherein said sensors surround said cradle, face skyward, and are configured to detect an overflight by downwardly targeted laser beams from an array of laser diodes mounted on an underside of the airframe of the UAV;
      ii) a radio transceiver;
      iii) a microprocessor;
      vi) a memory operatively coupled to said microprocessor, including non-transitory memory enabled to hold an instruction set executable by said microprocessor to operate said landing platform cooperatively with the UAV, wherein said instruction set is configured for detecting patterns of laser beam strikes on said laser sensors during an overflight;
   (c) wherein said cradle is configured with
      i) contoured support ribs with guide slots, each contoured rib and slot defining a trough, wherein said trough is configured to enable gravity-assisted coarse positioning of a boom of said airframe of the UAV in said cradle;
      ii) one or more reversibly lockable clamps configured to seat and dock the one or more booms of said airframe of the UAV in said cradle;
      iii) a power supply, said power supply having a connector configured to conductively engage a mating recharge-power circuit connector mounted on an underside of said airframe of the UAV when seated and docked in said cradle; and
   (d) wherein said microprocessor analyzes the patterns of laser beam strikes on the sensor array during an overflight, each laser beam strike defining an off center axis of the UAV relative to the landing area, and transmits to the UAV a radio signal containing exact location coordinate information of the side of the four-sided sensor configuration on the landing platform that detected the laser beam strike;
   (e) wherein the UAV, having a radio set configured to receive the location coordinate information transmitted from the landing platform, and having a flight control system configured to process information transmitted from the landing platform and autonomously navigate the UAV to execute a centered and oriented landing in said cradle with each boom of the UAV in a designated slot in said cradle.

2. The base station apparatus of claim 1, wherein said radio transceiver of said landing platform is configured to transmit, on detecting proximity of the UAV, an initial navigation command to switch on the downward-pointing laser diodes on the underside of the airframe and to overfly the landing platform according to a patterned flight path.

3. The base station apparatus of claim 1, wherein the microprocessor and radio transceiver are configured to broadcast exact location coordinate information to the UAV during the final stages of descent to a landing in the cradle, whereby that information is processed by the UAV to navigate a pattern of flight maneuvers that rotate and position the UAV so that the docking is made with a defined rotational orientation between the airframe and the cradle.

4. The base station apparatus of claim 1, wherein the landing platform comprises a plurality of said troughs, and wherein each trough is configured to receive a uniquely designated boom of the airframe when properly oriented.

5. The base station of claim 4, wherein, said plurality of troughs are disposed on a superior aspect of said cradle, and wherein said troughs are bordered by sloped members of said cradle such that said airframe, on descent into said trough, is guided to a center of said trough by said sloped lateral members.

6. The base station of claim 5, further comprising a secondary landing guidance system which comprises one or more actuators configured to adjust a position of the UAV when the UAV is located in the troughs.

7. The base station apparatus of claim 4, wherein said reversibly lockable clamps are defined by each a capacity to secure and lock a uniquely identifiable boom of said airframe when docked.

8. The base station apparatus of claim 1, further comprising a cavity to accommodate a gimballed camera or gimballed instrument package that is suspended from the UAV.

9. The base station of claim 1, further comprising a guided mechanical actuator configured to engage and establish an electrical connection or connections between mating connectors of the landing platform and the UAV, wherein the electrical connection or connections are for transferring power, data, or power and data in combination.

10. A method for operating a base station in cooperation with an unmanned aerial vehicle (UAV) comprising the steps of:
   providing a base station for receivingly docking and landing a UAV, the base station comprising a platform with cradle configured to orientedly receive one or more booms of an airframe of the UAV; a four-sided array of skywardly oriented laser sensors around the cradle configured to detect a pattern of downwardly pointed laser beams emitted from the underside of the UAV when the UAV is in flight above the base station, a microprocessor, a radio transceiver, a power-recharge connector configured to operatively engage a power-recharge circuit on a docked UAV, and one or more reversibly lockable clamps for seating and securing the UAV in the cradle when the UAV is docked;
   by the base station, activating a primary landing guidance system and issuing a command to a UAV hovering over the base station, the command ordering the UAV to turn on the laser beams and fly a defined flight path above the base station;

by the UAV, switching on the laser beams and flying the defined flight path received from the base station;

by the base station, transmitting a signal containing exact location coordinate information of the side of the laser sensor array that detected the laser beams;

by the UAV, from the location coordination information transmitted from the base station, autonomously solving for a flight path to achieve a required position and orientation relative to the base station and navigating the UAV to a centered and properly oriented landing in the cradle; and, by the base station, docking a recharge-power circuit connector to a corresponding connector on the airframe when the UAV is properly seated and clamped to said cradle.

11. The method of claim 10, further characterized by rotationally aligning the UAV during flight until each boom of the airframe is in a required rotational alignment relative to the cradle;

landing the UAV using the primary landing guidance system;

aligning and connecting a dataport on the base station to a correctly oriented data connector on the airframe;

downloading flight and imagery data from a memory on the UAV to the base station via the data connector; and, by the UAV, executing an autonomous launch from the base station on a command from a remote control center.

12. The method of claim 10, further comprising: receiving via a smartphone application a request from a user; transmitting the request and a location of the user to a control center of a fleet of said UAVs; and dispatching by the control center one of said UAVs to said location.

13. The method of claim 10, further comprising collecting video footage during flight and downloading video footage to said base station when cradled in said base station.

14. The method of claim 10, further comprises recharging the UAV while simultaneously downloading digital data.

15. A base station apparatus for docking an unmanned aerial vehicle (UAV) comprising:

(a) a cradle configured to receive and dock a UAV, said cradle surrounded on four sides by one or more walls;

(b) a primary landing guidance system comprising
  i) an array of laser sensors mounted on said one or more walls, wherein said sensors face skyward and are configured to detect downwardly targeted laser beams from an array of laser diodes mounted on the UAV;
  ii) a radio transceiver;
  iii) a microprocessor;
  vi) a non-transitory memory operatively coupled to said microprocessor, the memory comprising an instruction set executable by said microprocessor to determine when said laser sensors detect laser beams during an overflight of the UAV; and (c) a power supply configured to recharge the UAV when the UAV is in the cradle;

wherein said microprocessor is operative, in response to detection by one of said laser sensors of a laser beam during the overflight, to transmit via the transceiver to the UAV, a signal comprising location information of the side of the four sides having the sensor that detected the laser beam.

16. The base station apparatus of claim 15, wherein said radio transceiver is configured to transmit, on detecting proximity of the UAV, an initial navigation command to switch on downward-pointing laser diodes on the UAV and to overfly the base station apparatus according to a patterned flight path.

17. The base station apparatus of claim 15, wherein the microprocessor and radio transceiver are configured to broadcast exact location coordinate information to the UAV during final stages of descent to landing in the cradle, whereby the exact location coordinate information is processed by the UAV to rotate and position the UAV so that the UAV docks with a defined rotational orientation with respect to the cradle.

18. The base station apparatus of claim 15, wherein the cradle comprises a plurality of troughs, and wherein each trough is configured to receive a boom of the UAV when the UAV is properly oriented in the cradle.

* * * * *